Patented Sept. 19, 1950

2,522,776

UNITED STATES PATENT OFFICE 2,522,776

PROCESS OF RENDERING SYNTHETIC RUBBER TACKY

Warren F. Busse, Easton, Pa., assignor to General Aniline & Film Corporation, New York, N. Y., a corporation of Delaware No Drawing. Application October 11, 1946, Serial No. 702,572

9 Claims. (Cl. 154—139)

The present invention relates to the "tackification" and plasticization of synthetic rubbers of all kinds, particularly in order to improve the processing of the synthetic rubber and to improve the properties of the cured products obtained therefrom.

In the present active synthetic rubber program, it has been found that no difficulty is experienced in obtaining (as by the polymerization of butadiene or the interpolymerization of butadiene with other polymerizable monomers such as styrene, acrylic nitrile, isobutylene and the like) synthetic rubbers which have satisfactory tensile strength and abrasion resistance. The processing of such rubbers, as well as of other synthetic rubbers such as chloroprene, polyisobutylene, and the like, and the obtaining of cured products with satisfactory properties such as hysteresis and crack growth, however, have presented problems, the solutions of which have defied the art up to the present time.

As shown by Garvey, Whitlock and Freese (Industrial and Engineering Chemistry, 34, 1309, 1942), some of the difficulties which have been encountered in processing synthetic rubber are attributable to the fact that synthetic rubber has little "building tack" and is not readily amenable to extrusion without tearing. The lack of building tack makes it very difficult to construct composite articles such as tires and the like from individual plies of uncured material without the formation of blisters where the plies fail to adhere. Once such blisters are formed, tires and the like are ruined in a very short period of time. Garvey, Whitlock and Freese in the article referred to above state that the best solution of this problem appears to reside in the use of a cement made from natural rubber.

Synthetic rubber cannot be readily extruded or tubed into tread slabs or other forms, unless it be heavily loaded with softeners, which usually impair the properties of the final cured article. However, even with large amounts of the softeners generally used, some of the best synthetic rubbers, and particularly those which have a very high abrasion resistance, cannot be extruded without tearing of the slabs, illustrations of which are also shown by Garvey, Whitlock and Freese in the above article.

Synthetic rubber can be cured by the use of the agents generally employed for curing natural rubber. However, the products which are obtained on curing synthetic rubber up to the present time are inferior in some ways to the products obtained upon curing natural rubber, and especially where the cured product is to be employed in the manufacture of articles such as tires for trucks and buses and the like. The cured synthetic rubber products are found to have a number of very troublesome objections, the most important of which are their tendency to generate a large amount of heat on flexing ("hysteresis"), their low elongation at high temperatures, their tendency to crack rapidly after cracking is initiated ("crack growth"), and their tendency to become hard and brittle at low temperatures.

The generation of heat by the synthetic rubber on flexing gives considerable trouble when large size tires are made therefrom. The temperatures generated in such articles are usually so high that cotton cords are unsatisfactory and rayon cords must be employed. In some high-speed services, the temperatures become so high that even the rubber does not stand up and is literally blown apart.

The low elongation of the usual synthetic rubbers at high temperatures manifests itself when the rubber is used in the manufacture of tire treads by chipping and tearing of such treads if run over rough roads, particularly on hot summer days. The objection to the synthetic rubbers from the standpoint of their tendency to crack may be readily appreciated by the contrast between this action in natural rubber articles and in synthetic rubber articles. It has been found that once a synthetic rubber article has cracked, the cracks will grow, on flexing, at an enormously greater rate than they would in a similar article made from natural rubber. These defects of synthetic rubber articles have operated materially against the commercial exploitation of such articles, and one may therefore appreciate the importance of any procedure which would overcome these objections to the synthetic rubber articles. While all of these disadvantages are not possessed by each of the classes of synthetic rubbers, every synthetic rubber does show one or more of such objectionable properties.

Much of the work with synthetic rubber has dealt with endeavors to find substances which when compounded with the synthetic rubber will increase its tack and extrudability and improve the properties of the crude rubber without destroying the other desirable properties of the rubber. Many substances have been tried and among these may be mentioned coal tar, pitch, dibutyl phthalate, tricresyl phosphate, fatty acids, pine tar and similar substances. None of these substances, however, even when used in relatively large amounts—say, about 20 per cent—is effective in improving synthetic rubber to the point where it may be commercially handled and used like natural rubber.

I have now found that some of these manifold objections to the processing of synthetic rubber and to the properties of the cured products may be overcome by incorporating in the synthetic rubber an aryl sulfone or a polysulfone. The tackification and plasticization of synthetic rubber by the utilization of such sulfones and the products thus obtained are accordingly among the objects of the present invention.

A further object of the present invention involves the curing of the plasticized and tackified synthetic rubber and the products so obtained.

A further object involves the use of the tackified and plasticized synthetic rubber as a cement in building up plies of synthetic rubber.

Other objects will be apparent as the description proceeds.

I have found that any of the diaryl sulfones and polysulfones are suitable for my purposes. Examples of diaryl sulfones which I have found to be satisfactory are diphenyl sulfone, xylyl diethylphenyl sulfone, tolyl xylyl sulfone, ditolyl sulfone, dixylyl sulfone, dinaphthyl sulfone and the like. Examples of aryl alkyl sulfones which may be used include tolyl propyl sulfone, phenyl butyl sulfone, phenyl oleyl sulfone and the like. Examples of polysulfones which I have found to be effective are polyvinyl phenyl sulfone, polypropylene sulfone, polybutylene sulfone and the like. Reaction products of vinyl sulfones with primary or secondary amines or with $NH_3$ may also be used. Certain of the sulfones operate to produce better results than the others, improving the tack of the uncured compound and increasing the elongation and decreasing hysteresis of the cured compound. This is particularly true of those which are liquid at room temperature (about 20° C.) or are very soluble in the rubber. But in general, all improve the properties of the synthetic rubbers to a very marked extent.

The amounts of the sulfones which are utilized for incorporation with the synthetic rubbers may vary to a large extent. It is possible to use amounts up to 40 or 50 per cent by weight of the rubber, but it is not usually advisable to use such large quantities for the same tend to decrease the tensile strength of the cured rubber. It has been my experience that for best results, small amounts ranging up to about 20 per cent by weight of the synthetic rubber should be used. The preferred range is from about 2 to about 15 per cent by weight of the rubber.

The invention is applicable to any of the known synthetic rubbers such as polymerized diolefines, i. e. polymerized butadiene, copolymers of butadiene with styrene, acrylic nitrile, isobutylene, methyl acrylate, methacryl nitrile, methyl methacrylate, or the like, chloroprene, polymerized olefines, i. e. polyisobutylene and the like, thiokol and other known synthetic rubbers. Of course the improvements obtained will vary, depending upon the particular synthetic rubber which is selected. The improvement is most marked in the case of the copolymers of butadiene with styrene and butadiene with the acrylic acid derivatives and methacrylic acid derivatives and the plasticization and tackification of these synthetic rubbers with the sulfones represent the preferred modification of the invention.

It has been stated above that the sulfones operate both to tackify and plasticize the synthetic rubber. However, these two actions should not be confused, for the reason that plasticization involves fundamentally a softening action, whereas tackification involves the rendering of the surface of a substance to which the tackifier is added, sticky and tacky. Some substances, such as the sulfones of the present case, are both tackifiers and plasticizers. Generally, however, substances which are plasticizers are not tackifiers, and this is particularly true of tricresyl phosphate, coal tar, fatty acids, dibutyl phthalate and the like previously referred to.

The effect obtained by utilizing the sulfones is striking, to say the least. Many of these substances are crystalline bodies, which would hardly be expected to improve the characteristics of synthetic rubber. The exact mechanism by which the improvement is wrought is not known, but it is a fact that these sulfones markedly enhance the processing properties and building tack of uncured synthetic rubbers and improve the cured rubber by increasing the elongation and resilience without detrimentally affecting the tensile strength or the hand tear resistance. It might be noted here that the latter test is a very sensitive one for some of the important qualities of rubber.

The rubber is plasticized with the sulfones in the manner usual in the art, such as by mixing on rubber mills, or in a Banbury mixer or in similar apparatus. Where the rubber is obtained in the form of a dispersion, the sulfones may also be dispersed and added directly to the same. No unusual ingredients are required in order to effect curing of the rubber containing the sulfones added thereto and I have found that I may use the same materials as are generally employed in the art for curing natural rubber.

The procedure outlined above envisages the incorporation of the sulfone in the mass of rubber or in a dispersion thereof. There is another procedure which I have discovered which also gives valuable results if it is not desired to obtain the benefits of improved extrusion properties for the synthetic rubber. This procedure embraces the mixing of the sulfones with a vulcanizable synthetic or natural rubber cement and the use of such cement to adhere uncured surfaces of synthetic rubber sheets together in building composite articles therefrom. The sulfone when applied to the surfaces of the sheets renders the same very tacky, so that when the sheets are superimposed they stick together and during cure the sulfone tends to migrate from the surface, making a composite structure of more uniform composition.

The following examples (in which the parts are in terms of parts by weight of the rubber used) will serve to illustrate the invention, but it is to be understood that the examples are not to be considered limitative.

*Example 1*

100 parts of a synthetic rubber obtained by the copolymerization of butadiene and styrene are milled with 10 parts of xylyl diethylphenyl sulfone. The product thus obtained is much softer and tackier than the synthetic rubber itself. In contrast to the untreated synthetic rubber, it could be readily extruded without tearing.

*Example 2*

100 parts of a synthetic rubber obtained by copolymerizing butadiene with styrene are milled with 20 parts of xylyl diethylphenyl sulfone, 40 parts of a channel carbon black—"Micronex," 40 parts of a thermal decomposition carbon black—

"Gastex," 5 parts of zinc oxide, 2 parts of stearic acid, 1 part of benzthiazyl disulfide and 2.25 parts of sulphur. The resulting composition is quite tacky when uncured. It is very suitable for molding intricate parts in the formation of which the composition must flow and knit together in the mold. It is also excellently adapted for building composite laminated articles which must be cured together into an integral unit.

The composition was cured in a press for 30 minutes at a temperature of 298° F. A similar composition, but free from the sulfone, was cured under the same conditions. The articles obtained by curing the composition containing the sulfone had a greater ultimate elongation, a lower modulus of elasticity at low elongation (hereinafter called the modulus) and a hand tear resistance about equal to that of the articles obtained from the control composition. The resilience of the articles obtained from the composition containing sulfones, however, exceeded that of the articles obtained from the control composition, indicating that it has a lower heat generation than the control on flexing.

Example 3

100 parts of the same synthetic rubber are milled with 10 parts of xylyl diethylphenyl sulfone and the same amounts of the other ingredients mentioned in the preceding example. The product obtained readily cured in 30 minutes under the conditions of Example 2. The product exhibited properties intermediate between those of the control and the other composition of Example 2.

Example 4

100 parts of the synthetic rubber obtained by copolymerizing butadiene with styrene are milled with 10 parts of tolyl xylyl sulfone and the same amounts of the other ingredients mentioned in Example 2. The composition so obtained is cured for 30 minutes under the conditions previously noted. The product obtained is similar in properties to the product of Example 3. The composition cured readily in the time and under the conditions stated, indicating that the sulfones have no effect on the rate of cure of the synthetic rubber.

Example 5

100 parts of a copolymer of butadiene and acrylic nitrile were milled on a small laboratory mill with 20 parts of xylyl diethylphenyl sulfone.

The product thus obtained was considerably softer and tackier than the control, but it was resilient rather than dead and putty-like. The increased tack and softness make it flow easier in the mold, thereby facilitating the formation of intricate molded articles therefrom.

Example 6

The control and the treated batches of synthetic rubber of Example 5 were each mixed with compounding ingredients to produce the following compositions:

| | A | B |
|---|---|---|
| Copolymer of butadiene and acrylic nitrile | 100 | 100 |
| Xylyl phenyl sulfone | | 20 |
| Channel black "Micronex" | 40 | 40 |
| Thermal decomposition black "Gastex" | 40 | 40 |
| Zinc oxide | 5 | 5 |
| Stearic Acid | 2 | 2 |
| Benzthiazyldisulfide | 1.5 | 1.5 |
| Sulfur | 1.5 | 1.5 |

The compositions were each cured for 30 minutes at 298° F. and both gave good, tightly cured articles, thus establishing that the sulfone has little effect on the rate of cure. The large amount of carbon black used made both compositions "dry up" to some extent but the B composition containing the sulfone retained a greater surface tack. After curing, the articles obtained with composition B were somewhat softer and had a lower modulus at low elongation than the articles from composition A, due in part to the dilution effect of the sulfone. It was more resilient than the article from composition A and it had a lower permanent set than the latter article.

Example 7

Two compositions were produced by mixing the following components in the proportions stated:

| | A | B |
|---|---|---|
| Butadiene styrene copolymer synthetic rubber | 100 | 100 |
| Xylyl diethylphenyl sulfone | | 10 |
| Channel gas black "Micronex" | 40 | 40 |
| Zinc oxide | 5 | 5 |
| Stearic Acid | 2 | 2 |
| Accelerator sold under the trade name "Santocure" | 1.5 | 1.5 |
| Sulfur | 2.25 | 2.25 |
| | 150.75 | 160.75 |

Each composition was cured for 60 minutes at 298° F. In compounding composition B, it was found that the carbon black could be incorporated at a greater rate than in compounding composition A. Composition B, moreover, was a softer stock, with a greater surface tack. These effects were accomplished without appreciably altering the "knotty" hand tear resistance of the cured compositions.

Example 8

Composition A of Example 7 was utilized to produce sheets of uncured stock having a thickness of about 1/8 inch. These sheets were plied together to form a block 1/2 inch in thickness and the block was cured under pressure to form a coherent unit. To assure adhesion and an integral welding together of adjacent sheets during cure, the surfaces were coated before plying, with a thin layer of a cement having the following composition:

| | Parts |
|---|---|
| Composition A, Example 7 | 150.75 |
| Xylyl diethylphenyl sulfone | 30 |
| Benzene | 2000 |

On drying, this cement makes the surfaces very tacky and on curing, the sulfone migrates away from the interfaces, thereby tending to make a structure of uniform composition and properties throughout.

The results obtained in the examples are quite similar, if there be used in lieu of the synthetic rubbers mentioned in the examples, such synthetic rubbers as, polyisobutylene, copolymerisates of butadiene with the other monomers mentioned and the like.

Similarly, the specific sulfones of the examples may be replaced with equally good results by equivalent amounts of other sulfones, such as diphenyl sulfone, dixylyl sulfone, ditolyl sulfone and the like, and by polysulfones, such as polyvinyl phenyl sulfone, polypropylene sulfone and the like.

Various modifications of the invention will occur to those skilled in the art and hence I do not intend to be limited in the patent granted except as required by the prior art and the appended claims.

I claim:

1. The process of plasticizing and tackifying a synthetic rubber selected from the class consisting of chloroprene, polyisobutylene, polymerized butadiene and copolymers of butadiene with a monomer selected from the class consisting of styrene, acrylic nitrile, isobutylene, methyl acrylate, methacryl nitrile and methyl methacrylate, which comprises mixing the same with from 2 to 20% by weight of the synthetic rubber of a sulfone selected from the class consisting of diaryl sulfones, and arylalkyl sulfones.

2. Plasticized and tackified synthetic rubber compositions essentially comprising a synthetic rubber selected from the class consisting of chloroprene, polyisobutylene, polymerized butadiene and copolymers of butadiene with a monomer of the class consisting of styrene, acrylic nitrile, isobutylene, methyl acrylate, methacryl nitrile and methyl methacrylate, said synthetic rubber having incorporated therewith from 2 to 20% by weight of said rubber of a sulfone selected from the class consisting of diaryl sulfones and arylalkyl sulfones.

3. The process of producing cured synthetic rubber articles which comprises mixing a synthetic rubber selected from the class consisting of chloroprene, polyisobutylene, polymerized butadiene and copolymers of butadiene with a member of the class consisting of styrene, acrylic nitrile, isobutylene, methyl acrylate, methacryl nitrile and methyl methacrylate, which comprises mixing such a synthetic rubber with from 2 to 20% by weight of the rubber of a sulfone selected from the class consisting of diaryl sulfones and arylalkyl sulfones, adding the usual vulcanizing additions comprising zinc oxide, carbon black, sulfur, and a vulcanization accelerator, and curing the compositions.

4. The process as defined in claim 1 wherein the sulfone is a diaryl sulfone and wherein said sulfone is utilized in an amount ranging from 10 to 20 per cent by weight of the rubber.

5. The process as defined in claim 1 wherein the synthetic rubber is a copolymer of butadiene and styrene.

6. The composition as defined in claim 2 wherein the sulfone is present in an amount of 10 to 20 per cent by weight of the synthetic rubber.

7. The process of fabricating articles of synthetic rubber selected from the class consisting of chloroprene, polyisobutylene, polymerized butadiene and copolymers of butadiene with a monomer of the class consisting of styrene, acrylic nitrile, isobutylene, methyl acrylate, methacryl nitrile and methyl methacrylate which comprises moistening the adjacent surfaces of uncured plies of such rubber with a cement containing an organic solution of a rubber, a sulfone selected from the class consisting of diaryl sulfones and arylalkyl sulfones and the usual vulcanizing ingredients comprising zinc oxide, carbon black, sulfur, and a vulcanization accelerator, pressing the surfaces into intimate contact and curing the plied-up article to a coherent unit.

8. The process as defined in claim 1 wherein the sulfone is diphenyl sulfone and wherein said sulfone is utilized in an amount ranging from 2 to 15% by weight of the rubber.

9. Plasticized and tackified synthetic rubber as defined in claim 2 wherein the sulfone is diphenyl sulfone and the same is utilized in an amount ranging from 2 to 15% by weight of the synthetic rubber.

WARREN F. BUSSE.

REFERENCES CITED

The following references are of record in the file of this patent:

UNITED STATES PATENTS

| Number | Name | Date |
|---|---|---|
| 2,127,400 | Gibbs | Aug. 16, 1938 |
| 2,188,286 | Merrill | Jan. 23, 1940 |
| 2,337,464 | Hecht et al. | Dec. 21, 1943 |
| 2,363,618 | Patrick | Nov. 28, 1944 |
| 2,391,330 | Morris et al. | Dec. 18, 1945 |
| 2,395,071 | Sarbach | Feb. 19, 1946 |
| 2,442,083 | Hall et al. | May 25, 1948 |
| 2,443,678 | Garvey | June 22, 1948 |

OTHER REFERENCES

Ludwig et al.: India Rubber World, vol. III, No. 2, November 1944, pp. 180–186.